United States Patent Office 3,786,015
Patented Jan. 15, 1974

3,786,015
METHOD FOR PREPARING FAST CURING SIL-
ANOL-CONTAINING ORGANOPOLYSILOXANE
RESINS AND USE OF SUCH RESINS
Duane F. Merrill, Balston Spa, and Philip J. Lavan,
Schenectady, N.Y., assignors to General Electric Company
No Drawing. Filed Dec. 22, 1971, Ser. No. 211,047
Int. Cl. C08g 51/34
U.S. Cl. 260—32.8 SB                                 8 Claims

ABSTRACT OF THE DISCLOSURE

Method for preparing fast curing silanol-containing organopolysiloxane resins is provided. Organohalosilanes are hydrolyzed in a water immiscible organic solvent, utilizing acetone as a cosolvent. Selected portions of certain carboxylic acid salts are added in increments. The subject resins are fast curing and are especially useful in coating formulations.

BACKGROUND OF THE INVENTION

The present invention relates to a method for making fast curing silanol-containing organopolysiloxane resins and to the use of such resins.

Recently, there has been an increased demand for fast curing heat stable organopolysiloxane resins to satisfy the requirements of modern coating and molding techniques. For example, one of the requirements of coating continuous lengths of a substrate is that the resin must cure within a few minutes or less. Additional industrial requirements dictate that the cured resin must bond strongly to the substrate and must not chip, flake, or peel, particularly upon flexing or bending of the substrate.

Those skilled in the art know that one of the ways of improving the cure rate of organopolysiloxane resins is by increasing the "silanol content" of the resin which can be described as the weight percent of hydroxy radicals attached to silicon, based on the total weight of the resin. Heretofore, various methods were known for making silanol-containing organopolysiloxane resins. For example, Duane Pat. 2,646,441 teaches that an alkali bicarbonate can be employed in combination with a nonaqueous solvent, such as diethylether, to convert organohalosilanes to silanol-containing organopolysiloxanes. Although Duane's silanol-containing organopolysiloxane resins have been found useful in many applications, residual amounts of alkali metal ions such as sodium ions, are generally retained by the resin and are difficult to remove. As a result, resins made by Duane's method often suffer from poor heat stability since the retained metal ions readily catalyze polymer breakdown. Brewer et al., Pat. 3,135,713, assigned to the same assignee as the present invention, shows the employment of ammonium carbonate as a neutralizing agent for making silanol-containing organopolysiloxane resins. Even though the organopolysiloxane resins made by the method of Brewer et al. are free of metal ions and show improved heat stability, the silanol content of the resins are generally less than 5%. As a result of the low silanol content and other factors, the organopolysiloxane resins made by the method of Brewer et al. do not possess a cure rate which is sufficient to satisfy modern coating and molding techniques.

Recently it has been discovered that low molecular weight organopolysiloxane resins of enhanced reactivity, a fast cure time, and having a silanol content as high as 12% can be made by hydrolyzing organohalosilanes utilizing a solvent system containing a water immiscible organic solvent and acetone. The hydrolysis is achieved by agitating the organohalosilane in the presence of water, acetone, and organic solvent. The organic layer is separated from the acid layer, the organic solvent is stripped from the organic layer, and the residue is silicone resin product.

Such resins are prepared by a method which comprises (1) agitating a mixture comprising (A) organohalosilane, (B) water, (C) acetone, (D) a water immiscible organic solvent and (E) an aliphatic monohydric alcohol having from 1 to 8 carbon atoms where there is present by weight in said mixture, per part by weight of (A), 1.7 to 10 parts of (B),
0.2 to 5 parts of (C),
0.3 to 5 parts of (D),
and from 0 to 1 mole of (E) per mole of halogen attached to silicon of (A), and (2) separating an organic solvent solution of (F) from the resulting hydrolysis mixture of (1), where (F) is a silanol-containing organopolysiloxane having an average ratio of from about 1 to 2.0 organo radicals per silicon atom, and (A) is selected from (a) organotrihalosilane,
(b) a mixture of organotrihalosilane and diorganodihalosilane,
(c) the reaction product of (E) and a member selected from (a) and (b), which has an average ratio of up to one alkoxy radical per halogen radical, or
(d) a mixture of (c) and a member selected from organotrihalosilane and diorganodihalosilane, and where the organo radicals of (A) and (F) are attached to silicon by carbon-silicon linkages and are selected from monovalent hydrocarbon radicals, halogenated monovalent hydrocarbon radicals, and cyanoalkyl radicals. Such resins and method of preparation are disclosed in copending U.S. patent application Ser. No. 115,715, filed Feb. 16, 1971, disclosure of which is incorporated herein by reference.

Although such resin compositions cure quite quickly, such still are not quite fast enough to completely satisfy the curing requirements for various high speed continuous coating operations employed in many commercial facilities. The cure rate of a coating composition is one of the predominant factors which determines the throughput of a coating operation. Many coating facilities have the capacity to process much more material than is presently processed per unit time due to the limiting effect caused by the cure rate of the coating composition. Therefore, an increase in the cure rate would be greatly beneficial for coating operations. Likewise, increased cure times would be desirable for modern molding operations.

Accordingly, it is an object of the present invention to increase the cure rate of those silanol-containing polysiloxanes produced according to the procedure set forth in U.S. patent application Ser. No. 115,715 of Duane F. Merrill, filed Feb. 16, 1971, and entitled "Silanol-Containing Organopolysiloxane Resins and a Method for Making Them."

It is an object of the present invention to provide a coating process wherein the silanol-containing silicone resins can be continuously applied substrates such as aluminum foil to achieve a non-stick surface on the substrate after curing.

SUMMARY OF THE INVENTION

The process of the present invention is concerned with the preparation of a fast curing silicone containing resin composition which comprises:

(A) agitating a mixture of:
(1) organohalosilane being selected from the group of (a) organotrihalosilane, (b) mixture of organotrihalosilane and diorganodihalosilane, (c) reaction product of an aliphatic monohydric alcohol having 1 to 8 carbon atoms and a member selected from the group or organotrihalosilane and mixture of organotrihalosilane and diorganodihalosilane; which reaction product has an average ratio of up to one alkoxy radical per halogen radical,
(d) a mixture of the reaction product of (c) and a member selected from organotrihalosilane and diorganodihalosilane;

(2) from about 1.7 parts to 10 parts by weight of water, per part of organohalosilane;
(3) from about 0.2 to about 5 parts by weight of acetone, per part of organohalosilane;
(4) from about 0.3 part to about 5 parts by weight of a water immiscible organic solvent, per part of organohalosilane; and
(5) up to about 1 mole of an aliphatic monohydric alcohol having from 1 to 8 carbon atoms, per mole of halogen attached to the silicone on the organohalosilane;

(B) separating an organic solvent solution of a silanol-containing polyorganosiloxane having an average ratio from about 1 to 2.0 organo radicals per silicon atom from the resulting hydrolysis mixture; and where the organo radicals of the organohalosilane and the silanol-containing polyorganosiloxane are attached to silicon by carbon-silicon linkages and are selected from the group of monovalent hydrocarbon radicals, halogenated monovalent hydrocarbon radicals, and cyanoalkyl radicals;

(C) adding an initial portion of a carboxylic acid salt of a metal ranging from lead to manganese inclusive in the electromotive series of metals wherein said salt is soluble in said polyorganosiloxane, and in an amount sufficient to provide at least about 0.001% weight of metal based upon the weight of said silanol-containing polyorganosiloxane and wherein said amount is at least the minimum amount required to provide a through cure of said polyorganosiloxane in a preselected amount of time at a preselected cure temperature;

(D) contacting said carboxylic acid salt and said polyorganosiloxane for a time at least sufficient to achieve an equilibrium whereby said through cure of said polyorganosiloxane at said preselected cure temperature for said preselected cure time is achievable;

(E) then adding subsequent portion of carboxylic acid salt of a metal ranging from lead to manganese inclusive in the electromotive series of metals in an amount sufficient to provide at least about ½ of said minimum amount of metal required to provide said through cure, and whereby said salt is soluble in said polyorganosiloxane;

(F) and then admixing the carboxylic acid salt and the silanol-containing polyorganosiloxane.

The coating aspect of the present invention comprises applying the fast curing silicon-containing resin composition as prepared above to a substrate and then curing the composition.

"Through cure" as used in the present application refers to the solid, infusible, insoluble state of the siloxane resin whereby the maximum obtainable crosslinking density is achieved and whereby additional curing time and/or increased curing temperature will not alter the physical properties of the resin such as solvent resistance, steam resistance, steam and rub resistance, abrasion resistance, and slip angle.

DESCRIPTION OF PREFERRED EMBODIMENTS

Included by the organohalosilanes which can be employed in the practice of the invention, are silanes of the formula, (1) $(R)_aSiX_{4-a}$ where R is selected from monovalent hydrocarbon radicals, halogenated monovalent hydrocarbon radicals, and cyanoalkyl radicals, X is a halogen radical such as chloro, and $a$ is an integer having a value of 1 or 2. In addition, there can be employed in combination with such organohalosilanes of Formula 1, aliphatic monohydric alcohol of the formula, (2) R'OH or alkoxylated organosilane of the formula, (3) $(R)_a(R'O)_bSiX_{4-a-b}$ where R, X, and $a$ are as defined above, $b$ is an integer equal to 1 to 3, inclusive, and the sum of $a$ and $b$ is equal to 2 to 4, inclusive.

Radicals included by R of Formula I are mononuclear and binuclear aryl radicals and halogenated mononuclear and binuclear aryl radicals such as phenyl, xylyl, tolyl, chlorophenyl, naphthyl, etc.; mononuclear aryl lower alkyl radicals wherein the alkyl group contains from 1 to 8 carbon atoms such as benzyl, phenylethyl, etc., lower alkyl radicals and halo lower alkyl radicals wherein the lower alkyl group contains from 1 to 8 carbon atoms such as methyl, ethyl, propyl, butyl, chlorobutyl, pentyl, hexyl, heptyl, octyl, etc.; lower alkenyl radicals containing from 2 to 8 carbon atoms such as vinyl, alkyl, 1-propenyl, etc. radicals; cycloalkyl radicals containing from 5 to 7 ring carbon atoms such as cyclobutyl, cycloheptyl, cyclohexyl, etc. radicals; cyano lower alkyl radicals wherein the lower cyanoalkyl group contains from 2 to 8 carbon atoms such as cyanoethyl, cyanopropyl, cyanobutyl, etc. radicals. Radicals included by R' of Formula 2 are all of the aforementioned alkyl radicals having from 1 to 8 carbon atoms of R. In Formulas 1 and 2, where R and R' can be more than one radical, these radicals can be all the same or any two or more of the aforementioned radicals.

Included by the organohalosilanes of Formula 1 are for example, methyltrichlorosilane, dimethyldichlorosilane, methylphenyldichlorosilane, phenyltrichlorosilane, diphenyldichlorosilane, cyanoethyltrichlorosilane, methylcyanopropyldichlorosilane, etc. Included by the partially alkoxylated organohalosilanes of Formula 3 are reaction products of organohalosilanes of Formula 1, where R is preferably monovalent hydrocarbon radicals and halogenated monovalent hydrocarbon radicals, with alcohols of Formula 2 such as methyl alcohol, ethyl alcohol, propyl alcohol, isopropyl alcohol, butyl alcohol, etc.

In instances where the aliphatic monohydric alcohol of Formula 2 is utilized in the practice of the invention, the alcohol can be added directly to the organohalosilane of Formula 1 before hydrolysis, or it can be added to the hydrolysis mixture prior to the addition of the organosilane. As a result, the silanol-containing organopolysiloxane of the present invention can be free of or contain chemically combined alkoxy radicals attached to silicon.

Suitable organic solvents are, for example, any water immiscible organic solvent which is inert to the hydrolysis reactants during hydrolysis, and in which the hydrolyzate is soluble to provide for its separation from the aqueous layer. For example, there can be employed hydrocarbon such as benzene, toluene, xylene, etc.; esters such as butyl acetate, ethyl acetate; ethers such as diethylether, etc.

The various components of the hydrolysis mixture can be added concomitantly or separately in any desired order. Generally, the organohalosilane is added to the mixture of water, acetone and organic solvent. Preferably, when this method is used, a proportion of from 2 to 6 parts of water, 0.3 to 2 parts of acetone and 0.6 to 2 parts of organic solvent, per part of organohalosilane can be employed. It is preferred that the organohalosilane be added to the hydrolysis mixture rather than vice versa, as this limits the concentration of hydrochloric acid which is formed during the hydrolysis reaction. A strong hydrochloric acid solution is undesirable as the hydrochloric acid causes acid polymerization of the acetone forming polymerization products which add undesirable color to the product and have a deleterious effect on the physical properties of the product.

The preferred embodiment of the process of the present invention is the dual feed process. The dual feed process comprises feeding (A) the organohalosilane and from 0.9 to 5 parts, preferably, 0.9 to 1.2 parts, of (C) the acetone from separate containers and through separate conduits, then premixing them immediately prior to hydrolysis. It is necessary to limit the contact time if small amounts of water are present in the acetone or in the atmosphere in contact with the organhalosilane, as the water present causes hydrolysis of the organohalosilane generating acid which causes the acetone to polymerize. The initial hydrolysis medium prior to the introduction of the silane-acetone mixture contains from 0 to 4.1 parts of (C) the acetone, and preferably from 0.9 to 1.2 parts of (C) the acetone, and the amount of water, organic solvent and alcohol as set forth as (B), (D) and (E) above. The products produced by this dual feed method are among the preferred products produced by the methods of the present invention. They are preferred in that they have shorter cure times.

These preferred products can also be produced by a process in which the polymerization of acetone is prevented by the presence of carbon dioxide. This method comprises mixing carbon dioxide, 0.9 to 5 parts and preferably from 0.9 to 1.2 parts of (C) the acetone, and (A) the organohalosilane and adding this to the hydrolysis bath set forth above containing from 0 to 4.1 parts of (C) the acetone and amounts of (B) water, (D) organic solvent and (E) alcohol within the range set forth above. The carbon dioxide is used in an amount sufficient to substantially saturate the acetone-organohalosilane solution. Preferably, from 10 to 20 parts of carbon dioxide by weight, based on the organohalosilane, are employed when the carbon dioxide is used as a solid.

During the addition, the mixture is agitated to provide for a sufficient degree of hydrolysis of the organohalosilane and formation of the organopolysiloxane hydroyzate. The temperature of the hydrolysis mixture can be controlled by the rate of addition, or external heat, or cooling can be employed if desired. During hydrolysis a temperature between 20° C. to 40° C. is preferred. After the addition has been completed, the mixture can be stirred for an additional period of time such as 30 minutes or more to allow for complete hydrolysis of the organohalosilanes. The mixture is then allowed to settle and the acid layer can be drawn off from the organic layer. The organic layer can then be stripped of solvent to a solids concentration of up to about 95%.

The silanol-containing organopolysiloxane resins employed in the present invention can have from about 6% to about 12% by weight of hydroxy radicals attached to silicon and from about 0% to about 4% of alkoxy radicals attached to silicon. The preferred resins have less than 4% of alkoxy radicals attached to silicon. The resins can provide rigid or flexible coatings or can be friable molding materials when at 100% solids. Experience has shown that in most instances, the average ratio of the R radicals to silicon will determine the nature of the resin and its utility. For example, an average ratio of from about 1.2 to 1.4 for example, has been found effective for making varnish or paint formulations capable of imparting improved surface characteristics, as compared to prior art organopolysiloxane varnishes or paints. For example, paints or varnishes provided by the silanol-containing resins of the present invention, can impart such surface characteristics as superior gloss, superior resistance to the effects of organic solvents, etc., as compared to prior art organopolysiloxanes. These varnishes have been found to be faster curing than silicone resin varnishes provided by prior art methods. In situations where a more flexible coating is desired such as required for making a wire sleeving for glass cloth insulation, an average R to Si ratio of from about 1.4 to 2.0 has been found effective.

In addition, resins at 100% solids, having an average ratio of about 1 to about 1.2 R radicals per silicon atom, a silanol content of from 6% to 12% by weight, with or without chemically combined alkoxy radicals, are generally friable and suitable for molding applications. These moldable materials have been found to soften at temperatures as low as 60° C., and generally flow at temperatures between 70° C. to 90° C. Those skilled in the art know that such characteristics readily permit the incorporation of standard resin curing catalysts at temperatures below 100° C. Flow temperatures above about 100° C., such as 110° C. to 120° C., would be undesirable for transfer molding since the incorporation of curing catalysts at such temperatures can effect the premature cure of the resin prior to its transfer into the mold cavity.

Depending upon the R to Si ratio of the silanol-containing organopolysiloxane, it is sometimes preferable to strip either under reduced pressure or under atmospheric pressure. For example, when making molding resins it has been found expedient to strip under reduced pressure, such as a pressure between 25 mm. to 500 mm. Hg to a solids concentration of from 50% to 70% by weight of the resin solution. Resin impurities can be removed at this solids concentration such as by filtration, centrifuging, etc. Further stripping can be employed to 100% solids at a temperature sufficient to remove all of the residual solvent. For example, when stripping toluene a temperature up to 130° C. has been found effective.

In instances where the average R to Si ratio is above 1.2, for example, 1.2 to 1.4, or about 1.4 to 2.0, it is preferred to strip at atmospheric pressure to a solids concentration of up to about 95%. If it is desired, the resin can be refluxed 2 to 3 hours at temperatures between 190° C. to 230° C., to further improve the characteristics of the resin.

The carboxylic acid salts employed in the present invention are salts of metals ranging from lead to manganese, inclusive, in the electromotive series of metals. The particular metals included within this scope are lead, tin, nickel, cobalt, iron, cadmium, chromium, zinc and manganese. The specific metal ion which is preferred is iron. The carboxylic acids from which the salts of these metals are derived can be monocarboxylic acids or dicarboxylic acids. The metallic salts employed in the present invention are soluble in the organopolysiloxane.

Illustrative of metal salts which can be employed in the practice of the present invention are, for example, zinc naphthenate, lead naphthenate, cobalt naphthenate, iron 2-ethylhexoate, cobalt octoate, zinc octoate, lead octoate, chromium octoate, tin octoate, and iron octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilactate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, tris-phenyl lead cyclohexenyl acetate, triphenyl lead ethylmalonate, etc.

The preferred catalyst employed in the process of the present invention is iron octoate. It has been found that of all the catalysts tested by applicants in the process of the present invention, iron octoate provides the fastest cures. For instance, iron octoate when employed in the process of the present invention provides faster cures than the octoic acid salts of zinc, cobalt, lead, and manganese.

In addition, those cured products prepared according to the present invention which employ iron octoate exhibit noticeably enhanced solvent resistance to organic materials as compared to cured products employing other carboxylic acid salts. Solvent resistance is especially crucial when the compositions of the present invention are to be utilized as coatings on substrates which are continually exposed to organic liquids or organic vapors. For example, when the compositions prepared according to the present invention are used as release coatings on aluminum foil or cooking utensils.

In order to obtain the improved curing chaarcteristics according to the present invention, it is essential to initially incorporate a portion of the carboxylic acid salt in an amount sufficient to provide at least about 0.001% by weight of metal based upon the weight of the silanol-containing polyorgano-siloxane. In addition the amount of catalyst must be at least the minimum amount required to provide a through cure of the polyorganosiloxane in a preselected amount of time at a preselected temperature. Usually the maximum quantity of carboxylic acid salt added at this stage of this process is sufficient to provide at most about 0.1% by weight of metal based upon the weight of the silanol-containing polyorganosiloxane. Amounts greater than that are of no practical advantage. It is recognized that the minimum quantity of catalyst is dependent upon the specific catalyst employed and upon the particular silanol-containing polysiloxane.

This initial portion of catalyst and the silanol-containing polyorganosiloxane must be in contact for a period of time which is at least sufficient to achieve equilibrium in the composition whereby the through cure of the polyorganosiloxane at the preselected temperature and time could be achieved if subjected to the preselected temperature for the preselected period of time. This contact time is greater than that generally necessary to uniformly disperse the salt throughout the resin composition. The exact amount of contact time between the initial portion of the carboxylic acid salt and the polyorganosiloxane primarily depends upon the catalyst and upon the particular silanol-containing polysiloxane employed.

Usually the contact must be carried out for at least about 1 hour. The specific contact time for any given system can readily be determined by routine experimentation. One quick method is to use the puddle cure determination. This involves placing about 5 drops of the composition in a small receptacle having a circumference of about ½ inch, and stirring the composition until it is no longer liquid and becomes stringy and rubbery. The time necessary for this change to occur is recorded. If the contact time has been sufficient to allow establishment of an equilibrium, then the recorded time necessary for the above change will correspond to that time previously determined as the standard for that particular composition.

Another experimental method to assure that the contact time has been sufficient is to take a sample of the composition and then apply it to a suitable substrate and cure it for the requisite time at the preselected temperature. Then the coated substrate can be tested for various properties such as solvent resistance, steam resistance, abrasion resistance, steam and rub resistance, and slip angle to ascertain whether such properties are consistent with those properties previously determined as standards for that particular composition. For example, if the contact time has not been sufficient to achieve an equilibrium, then the properties of the cured composition will be inferior to those of a cured composition whereby a through cure has been achieved.

If the quantity of carboxylic acid salt added at this stage of the process is not sufficient to provide a through cure of the polymer and/or if the contact time between the catalyst and polymer is not sufficient so that a through cure could be achieved, the advantages of the present invention with respect to vastly reduced cure rates cannot be achieved regardless of the quantity of curing agent subsequently added.

After this equilibrium has been achieved, a subsequent portion of the carboxylic acid salt is added to the composition. The amount added at this stage must be sufficient to provide at least about one half of the minimum quantity of metal necessary to provide a through cure at the preselected time and temperature. The maximum amount of carboxylic acid salt usually added at this stage of the process is about 10 times such minimum amount of metal required for a through cure at said preselected temperature and time. Preferably the amount of salt added during this stage of the process provides between about 2 times to about 6 times the minimum amount of metal required for the through cure at the preselected cure temperature and cure time. If an amount less than that necessary to provide at least about one half of the minimum amount of metal required to provide a through cure at the preselected time and temperature is used, significant improvements in the cure rate of the composition will not be observed. The time of admixing the subsequent portion of carboxylic acid salt and silicone need only be sufficient to substantially disperse or dissolve the salt uniformly throughout the composition. Usually such only requires about 15 minutes for plant size batches such as about 9,000 gallons.

It was quite surprisingly found that the particular incremental addition of catalyst as set forth in the present invention significantly improved the cure rate of the compositions. For example, if the total amount of initial and subsequent portion of catalyst were added as one addition rather than according to the process of the present invention, the cure rate would not be any different than the cure rate that would be obtained by using only the amount which is initially added in the process of the present invention. Likewise, a continuous addition of the catalyst in amount equal to the total amount employed as the initial and subsequent portion provides curing rates no faster than the rate obtained by just using the amount which is added as the initial portion in the present invention. Accordingly, only by the specific addition as carried out in the present invention are the improved curing rates obtained. For example, by the practice of the present invention, curing rates up to three times as fast as the rate obtained when using only an amount equal to the initial portion are possible. In addition this phenomena has only been observed with respect to the types of silanol-containing polyorganosiloxanes set forth in the present invention. Moreover, this effect has been observed with the silanol-containing polyorganosiloxanes used herein for ratios of organic to silicon from 1 to about 2. Usually the total amount of catalyst added is between about 0.09% to about 0.36% by weight of metal based upon the weight of the polyorganosiloxane.

The compositions of the present invention can also be varied by the incorporation of various extenders or fillers. Illustrative of the many fillers which can be employed with the compositions of the present invention are titanium dioxide, liphopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. When fillers are added to the compositions of the present invention, they are generally employed in amounts of about 10 to 300 parts per filler per 100 parts of the silanol-containing polyorganosiloxane.

In addition, the compositions of the present invention can be modified by the incorporation of various flame retardants, stabilizing agents, and plasticizers. Suitable flame retardants include antimony oxide, various polychlorinated hydrocarbons, and organic sulfonates.

The compositions of the present invention preferably are employed as coatings and particularly as release coatings to provide non-stick surfaces. The compositions of the present invention form extremely secure bonds to such diverse substrates as aluminum, glass, and ceramics. In addition, when the compositions are applied to flexible substrates such as aluminum foil, they do not chip, flake, or peel upon repeated creasing and restraightening of the foil. Also the compositions of the present invention readily provide uniform coatings upon the substrates. It has been found that the particular compositions of the present invention when applied, for example, to aluminum foil, prevent sticking of food to the foil either during cooking or upon freezing of the food within the aluminum foil.

Also, the compositions of the present invention are capable of providing excellent protective coatings over all kinds of aluminum substrates such as castings, extruded and heavy sheet aluminum. Such coatings prevent the formation of aluminum oxide upon the substrate which dulls the surface appearance and would eventually pit the aluminum. Another advantage of the coatings of the present invention when cured is that they aid in the prevention of ice built up upon exposed metal substrates during freezing rains.

The compositions of the present invention can be applied to a particular substrate by any of the known convenient methods of coating. For example, the compositions can be applied by dip coating, spray coating, or roll coating. After the substrate is coated, the resin can be continuously cured by passing the coated substrate through strip heaters or through heated paper or cloth coating type towers. Usually the coatings are cured between about 300 and about 600° F. Temperatures below 300° F. require too much time for normal commercial operations and temperatures above about 600° F. begin to cause some degradation of the polymer structure. Of course, temperatures higher or lower than the above range can be employed if such disadvantages can be tolerated.

The compositions are usually applied from solutions of organic solvents such as toluene, xylene, VM&P naptha. In addition, it is preferred to add some butyl Cellusolve to the composition to extend the shelf life of the composition. The time required to effect the cure of the composition will vary according to the particular resin employed, the particular catalyst system, the relative amount of catalyst, the temperature, and the thickness of the coating. Usually, it is desirable to cure the composition within a few minutes.

The thickness of the coating will vary depending upon the particular application to which the coated substrate is to be employed. For example, a coating of about 0.2 to 0.35 mil thickness is quite adequate when coating aluminum foil or cooking utensils such as bread pans whereas coatings of about 1 mil would be desirable when coating a substrate to be employed for outdoor use.

The following non-limiting examples are given wherein all parts are by weight unless the contrary is given.

EXAMPLE A

There are added 1000 parts of a silane blend consisting of 157 parts of methyltrichlorosilane, 443 parts of phenyltrichlorosilane, 135 parts of dimethyldichlorosilane and 265 parts of diphenyldichlorosilane in 600 parts of xylene, to a mixture of 300 parts of acetone and 400 parts of water. The rate of addition is controlled over a period of 20 minutes to provide for a temperature no greater than 72° C. After the addition, the mixture is stirred for an additional 15 minutes and allowed to settle. The organic layer is then recovered by separating off the acid layer. The solvent is then stripped from the resulting resin product at a temperature of between 160° C. to 200° C. at atmospheric pressure. There is obtained a concentration having about 95% solids and a silanol content of about 6.7%. The resin is refluxed at 200° C. for an additional 3 hours. The product is a varnish of a methylphenylpolysiloxane resin having an average ratio of 1.8 methyl and phenyl radicals, per silicon atom.

EXAMPLE B

Into a hydrolyzer are charged 900 parts of toluene, 900 parts of acetone, and 300 parts of water. The mixture is cooled to 15° C. From separate containers are fed, to a point near the outlet of a common dip leg of the hydrolyzer, 900 parts of acetone and a mixture of 680 parts of methylthichlorosilane and 320 parts of phenyltrichlorosilane. The temperature is maintained below 45° C. by the addition rate. The addition requires 30 minutes and is performed with continuous agitation. The agitation is continued for 15 minutes following completion of the silane addition. The acid water phase is then allowed to settle for 15 minutes and removed. 100 parts of water are charged to the resin phase and the mixture is emulsified. The solvent and water phase are then vacuum stripped to a 60% solids concentrate. The concentrate is filtered through diatomaceous earth and fuller's earth to remove acid.

EXAMPLE 1

To 100 parts of the composition of Example A are added with agitation 0.06% by weight of iron as iron octoate based upon the weight of the methylphenylpolysiloxane resin and 375 parts of a solvent mixture containing 11 weight percent toluene, 69 weight percent VM&P naphtha and 20 weight percent butyl Cellosolve. The composition is slowly agitated for about 1 hour. A sample of the composition is then tested according to the puddle cure procedure discussed above. The composition has a puddle cure time of 10 seconds. In addition, the composition at this point is poured on a tin coated steel test panel, and the solvent is evaporated by standing at room temperature for 30 minutes to form a 0.2 mil thick coating. The test panel is then placed in an oven preheated to 425° F. for 4½ minutes. The cured composition is tested for solvent resistance, steam resistance, steam and rub resistance, abrasion resistance, and slip angle according to well-known procedures. The results correspond to standard values previously determined for this composition. The 10 seconds for puddle cure and the properties for the 4½ minutes through cure correspond to standard values previously determined for the composition. Accordingly, the composition has reached an equilibrium at this point.

Then, 0.12% by weight based upon the weight of the methylphenylpolysiloxane resin of iron as iron octoate is added to the composition. The resin and catalyst are admixed for about 15 minutes. A sample of this composition is then coated onto a tin coated steel test panel to form a 0.2 mil coating. The composition is cured at 425° F. and requires only 1½ minutes to achieve a through cure. In addition the composition at this stage is tested for puddle cure and requires only 2 seconds to achieve puddle cure.

EXAMPLE 2

To 100 parts of the methylphenylpolysiloxane resin composition of Example A are added all at once with agitation 0.18% of iron as iron octoate based upon the weight of methylphenylpolysiloxane resin and 375 parts of a solvent mixture containing 11 weight percent toluene, 69 weight percent VM&P naphtha, and 20 weight percent butyl Cellosolve. The composition is slowly agitated for 24 hours at which time it is tested both for puddle cure and through cure according to the procedures described in Example 1. The time necessary for through cure is determined by placing 12 test panels in the heated oven and removing one after a one minute cure and removing one every 30 seconds thereafter and testing each panel for the properties specified in Example 1. That panel where the properties of the cure composition corresponds to the properties established as standards for the composition represents the through cure time. The puddle cure is 10 seconds and the through cure time is 4½ minutes at 425° F.

EXAMPLE 3

To 100 parts of the methylphenylpolysiloxane resin composition of Example A are added with agitation 0.18% of iron as iron octoate based upon the weight of phenylmethylpolysiloxane continually over a period of 2 hours and 375 parts of the solvent mixture added in Example 1. After the addition is complete, the composition is then agitated for an additional 24 hours. At this time the composition is tested for puddle cure and through cure according to the procedures set forth in Examples 1 and 2. The puddle cure of this composition is 10 seconds and the through cure is 4½ minutes at 425° F.

EXAMPLE 4

To 100 parts of the methylphenylpolysiloxane composition of Example B are added with agitation 0.06% by weight of iron as iron octoate based upon the weight of the methylphenylpolysiloxane and 200 parts of the solvent mixture added in Example 1. The composition is agitated for 1 hour. The composition is then tested for puddle cure and through cure according to the procedures set forth in Example 1. The puddle cure time is 10 seconds and the through cure time is 4½ minutes at 425° F. The puddle cure and through cure determinations correspond to standard values previously determined for this composition. Accordingly, the composition has reached an equilibrium at this point. At this time, 0.12% of iron as iron octoate based upon the weight of the methylphenylpolysiloxane is added to the composition with agitation. The composition is stirred for about 15 minutes. At this time the puddle cure of the composition is 2 seconds and the through cure is 1½ minutes at 425° F.

EXAMPLE 5

To 100 parts methylphenylpolysiloxane composition of Example B is added all at once with agitation 0.18% by weight of iron as iron octoate based upon the weight of polysiloxane resin and 200 parts of the solvent mixture added in Example 1. The composition is stirred for 24 hours. At this time, equilibrium has been established and the puddle cure is 10 seconds and the through cure at 425° F. is 4½ minutes as determined by the procedures described in Examples 1 and 2.

EXAMPLE 6

To 100 parts of the methylphenylpolysiloxane resin composition of Example B are added with agitation 0.18% by weight of iron as iron octoate based upon the weight of polysiloxane resin continually over a period of 2 hours, and 200 parts of the solvent mixture added in Example 1. The composition is then agitated for another 24 hours to insure equilibrium. The composition is then tested for puddle cure and through cure according to the procedures set forth in Examples 1 and 2. The puddle cure is 10 seconds and the through cure is 4½ minutes at 425° F.

A comparison of Examples 2 and 3 with Example 1 and Examples 5 and 6 with Example 4 clearly establishes that even though the same quantity and type of catalyst are employed in all the examples, the manner in which the catalyst is incorporated is crucial in achieving the advantages of the present invention.

EXAMPLE 7

In a commercial coating tower, aluminum foil is passed through a bath of the composition as prepared in Example 1. The foil is passed through the bath at a rate of 1500 feet/minute. The foil is continuously drawn through the solution and into a preheated tower. The tower has 3 heating zones. The first heating zone is set at 150° C. for solvent removal whereas the second and third zones are set at 217° C. for curing of the coating. The coated foil is exposed to the 217° C. temperature for 1½ minutes in order to affect a through cure of the resin film. The foil is coated with a 0.2 mil film of resin on each side thereof.

The coated foil is tested for food release by baking and oven frying a variety of meat, poultry, potatoes, and vegetables therein. The cooking test shows a 100% release of the food with no degradation of the release coating. In addition the coated foil is tested as a freezer wrap. Here again, the coating provided 100% release of meat at the freezing temperature of the meat. On the other hand an uncoated foil stuck to the meat until the meat had been partially thawed.

EXAMPLE 8

Example 7 is repeated except that the coating employed is the composition as prepared in Example 4. The results obtained are similar to those of Example 7.

What is claimed is:

1. A process for the preparation of a fast curing silicone containing resin composition comprising in combination the steps of
    (A) agitating a mixture of
        (1) organohalosilane,
        (2) from about 1.7 parts to about 10 parts by weight of water, per part of organohalosilane,
        (3) from about 0.2 to about 5 parts by weight of acetone, per part of organohalosilane,
        (4) from about 0.3 part to about 5 parts by weight of a water immiscible organic solvent, per part of organohalosilane, and
        (5) up to about one mole of an aliphatic monohydric alcohol having from 1 to 8 carbon atoms, per mole of halogen attached to the silicon on the organohalosilane,
    (B) separating an organic solvent solution of a silanol-containing polyorganosiloxane having an average ratio from about 1 to 2 organo radicals per silicon atom from the resulting hydrolysis mixture, said organohalosilane being selected from the group consisting of,
        (a) organotrihalosilane,
        (b) a mixture of organotrihalosilane and diorganodihalosilane,
        (c) a reaction product of an aliphatic monohydric alcohol having from 1 to 8 carbon atoms and a member selected from the group consisting of organotrihalosilane, and a mixture of organotrihalosilane and diorganodihalosilanes; which reaction product has an average ratio of up to one alkoxy radical per halogen radical,
        (d) a mixture of the reaction product of (c) and a member selected from the organotrihalosilane and diorganodihalosilane,
    and where the organo radicals of the organohalosilane and the silanol-containing polyorganosiloxane are attached to silicon by carbon-silicon linkages and are selected from the group consisting of monovalent hydrocarbon radicals, halogenated monovalent hydrocarbon radicals, and cyanoalkyl radicals;
    (C) adding an initial portion of a carboxylic acid salt of a metal ranging from lead to manganese inclusive in the electromotive series of metals in an amount sufficient to provide from about 0.001% to about 0.1% by weight of metal based upon the weight of said organopolysiloxane and to provide at least the minimum amount of metal required to provide a through cure of said polysiloxane at a preselected curing temperature for a preselected cure time, and whereby said salt is soluble in said polysiloxane;
    (D) contacting said carboxylic acid salt and said polyorganosiloxane for a time at least sufficient to achieve a through cure of said polyorganosiloxane at said preselected cure temperature and preselected cure time;
    (E) then adding a subsequent portion of a carboxylic acid salt of a metal ranging from lead to manganese inclusive in the electromotive series of metals in an amount of about 0.09% to about 0.36% by weight of metal based on the weight of the polyorganosiloxane sufficient to provide at least about one half of the amount of metal of said minimum amount of metal required to provide said through cure, whereby said carboxylic acid salt is soluble in said polyorganosiloxane; and (F) then admixing the carboxylic acid salt and the polyorganosiloxane.

2. The process of claim 1 wherein said carboxylic acid salt is an octoate.

3. The process of claim 1 wherein said carboxylic acid salt is iron octoate.

4. The process of claim 1 wherein the initial portion of said carboxylic acid salt and said polyorganosiloxane are contacted for at least one hour.

5. The process of claim 1 wherein said subsequent portion of said carboxylic acid salt is in an amount sufficient to provide between about 2 times to about 6 times the minimum amount of metal required for said through cure at the preselected cure temperature and preselected cure time.

6. The process of claim 1 wherein said polyorganosiloxane contains methyl and phenyl radicals.

7. The process of claim 1 wherein the mixture contains from 2 to 6 parts of water, 0.3 to 3 parts of acetone, and 0.6 to 2 parts of toluene, and where the organohalosilane is selected from the class of:

(a) methyltrichlorosilane,
(b) phenyltrichlorosilane,
(c) a mixture of dimethyldichlorosilane and a member selected from the group of methyltrichlorosilane and phenyltrichlorosilane and mixture thereof,
(d) a reaction product of isopropyl and one of the above-mentioned chlorosilanes which reaction product has an average ratio of up to one isopropoxy radical per chlorine radical, and
(e) a mixture of the reaction product of isopropyl alcohol and a member selected from the above-described group of chlorosilanes.

8. The process of claim 7 wherein the toluene layer is stripped to a solid concentration of up to 95% at atmospheric pressure, and then refluxed for 2 or 3 hours at 200° C.

References Cited

UNITED STATES PATENTS

| | | | |
|---|---|---|---|
| 3,489,782 | 1/1970 | Pruvost et al. | 260—448.2 |
| 3,120,500 | 2/1964 | Huntington et al. | 260—46.5 R |
| 3,274,288 | 9/1966 | Harris et al. | 260—825 |
| 3,260,699 | 7/1966 | Schmidt | 260—46.5 R |
| 3,450,672 | 6/1969 | Merrill | 260—4.5 R |

OTHER REFERENCES

Meals et al.: Silicones, Reinhold Plastics Applications Series, Reinhold Pub. Corp., 1959, pp. 134–135.

Noll: Chemistry and Technology of Silicones, Academic Press, 1968, pp. 209–216.

LEWIS T. JACOBS, Primary Examiner

U.S. Cl. X.R.

260—37 SB, 46.5 R